United States Patent [19]

Nanda

[11] 4,187,763
[45] Feb. 12, 1980

[54] OVERLOAD RELIEF VALVE

[75] Inventor: Vinod K. Nanda, Schaumburg, Ill.

[73] Assignee: Gould Inc., Rolling Meadows, Ill.

[21] Appl. No.: 892,088

[22] Filed: Mar. 31, 1978

[51] Int. Cl.² .......................... F01B 1/00; F01B 15/00; F15B 11/16

[52] U.S. Cl. ...................... 91/176; 91/186; 91/514

[58] Field of Search .................. 91/412, 514, 176; 137/493

[56] References Cited

U.S. PATENT DOCUMENTS

| 2,270,943 | 1/1942 | Freundel et al. | 91/412 |
| 2,825,309 | 3/1958 | Geiger | 91/412 |
| 3,580,274 | 5/1971 | Hansen | 137/493 |
| 4,023,650 | 5/1977 | Pleier | 91/412 |

Primary Examiner—Paul E. Maslousky
Attorney, Agent, or Firm—Wegner, Stellman, McCord, Wiles & Wood

[57] ABSTRACT

An overload relief valve for use in preventing damage to the hydraulic system for adjustably positioning a working element, such as a blade. A single relief valve permits relief of high fluid pressure developed in either of the control cylinders by providing a crossover function therebetween under such conditions, as well as to relieve the fluid to tank in the event of a high pressure condition existing in both cylinders concurrently. The crossover relief may be effected by a similar first preselected high pressure condition in either of the cylinders.

6 Claims, 6 Drawing Figures

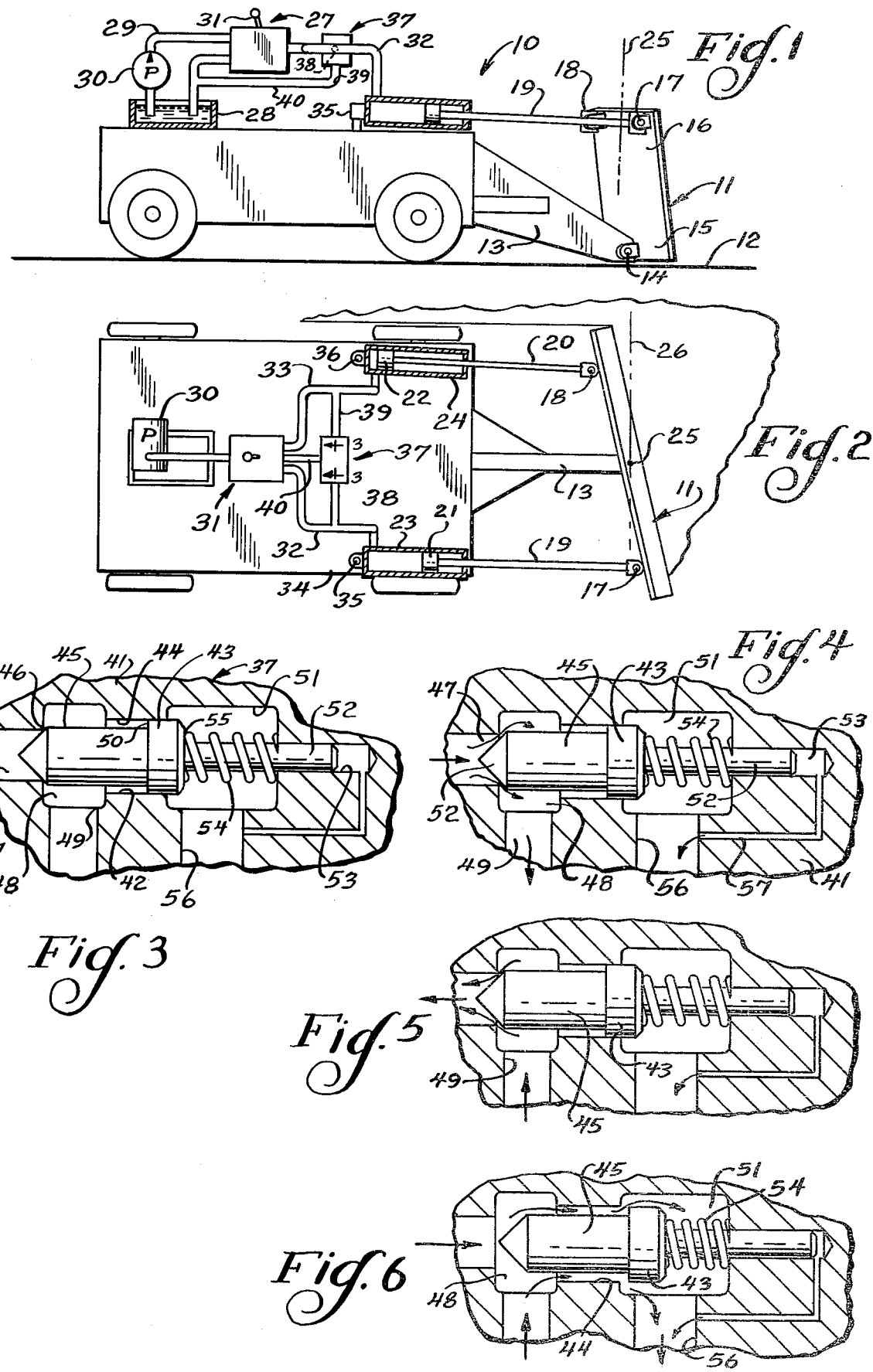

OVERLOAD RELIEF VALVE

BACKGROUND OF THE INVENTION

1. Field of the Invention

This invention relates to pressure relief means, and in particular to such means providing fluid crossover and fluid dumping functions.

2. Description of the Prior Art

In one form of hydraulic system, a working element, such as a snowplow, is held at a desired angular position by a pair of single acting cylinders connected to the snowplow blade through the piston rods thereof. The plow blade may be pivoted about a vertical central axis with the disposition of the blade being fixed by blocking the hydraulic connections with the blade in the desired disposition.

Adjustment of the plow blade disposition is effected by causing hydraulic fluid delivery to one or the other of the cylinders through a conventional direction control valve which may comprise a spool-type valve. The blocking condition in such a spool-type valve is effected by spring biasing the spool to a centered neutral position.

A problem arises in such hydraulic control systems in that, at times, an overload may be applied to a portion of the plow blade so as to produce a high pressure condition in one or the other of the cylinders. Unless some dissipation of this high pressure condition is provided, failure of the components of the system may result from the impact surges.

It has been conventional to provide some pressure relief means to provide a crossover relief between the cylinders under such abnormal high pressure conditions. It has also been conventional to provide some high pressure relief when both cylinders reach a high pressure condition as caused by a high load being applied concurrently thereto through the blade. Conventionally, such blades not only pivot about a vertical axis at the center thereof, but also about a horizontal axis at the bottom of the blade as a result of the concurrent forces applied thereto.

Heretofore, the control of such overload conditions has required the use of three different crossover relief valves resulting in a relatively expensive and complicated structure which, because of a large number of moving parts, further presents a serious maintenance problem.

SUMMARY OF THE INVENTION

The present invention comprehends an improved pressure relief means for use in such apparatus wherein a single relief valve provides the three relief functions required relative to such blade overload conditions.

As the pressure relief means of the present invention utilizes a single movable valve member and a single biasing means, the construction of the pressure relief means of the present invention is extremely simple and economical while yet providing an improved overload control.

More specifically, the improved pressure relief means of the present invention is adapted for use in an apparatus having a working element defining first and second spaced support portions, a first cylinder having a piston provided with a rod connected to the first support portion, a second cylinder having a piston provided with a rod connected to the second support portion, and adjustably controlled hydraulic supply means connected to the cylinders to provide hydraulic fluid to the cylinders for adjustably positioning the piston rods to position and retain the working element as desired. The relief means includes a body defining a piston chamber, a first port opening to the chamber and connected to the first cylinder, and a second port opening to the piston chamber and connected to the second cylinder, a piston in the chamber having a valve portion removably seating on the body at the first port for selectively closing the first port and defining in the chamber an annular space communicating with the second port at all times, the piston defining at an inner end of the space a pressure surface, and means biasing the piston to cause the valve portion to close the first port, the piston and ports being arranged in a closed condition of the pressure relief means to have fluid pressure from the first cylinder act on the valve portion closing the first port and fluid pressure from the second cylinder act on the pressure surface and to cause the piston to move against the action of the biasing means and provide communication between the first and second ports through the annular space as an incident of a preselected high cumulative fluid pressure being delivered to the first and second ports.

In the illustrated embodiment, the pressure relief means body further defines a third port opening to the piston chamber and connected to a return, or relief, tank. The piston and ports are arranged further to cause the piston to move further against the action of the biasing spring and provide communication between the first, second and third ports through the piston chamber to dump fluid therethrough to the return tank as an incident of a second preselected cumulative fluid pressure higher than the first preselected pressure being delivered to the first and second ports.

In the illustrated embodiment, the cross-sectional area of the first port is substantially equal to the cross-sectional area of the annular surface of the piston. In the illustrated embodiment, the first and second ports open perpendicularly to each other.

In the illustrated embodiment, the piston chamber defines a relief space behind the piston and closed from the annular space by the piston when the relief means is in the closed condition. The relief space communicates with the annular space when the piston is moved by the existence of the second preselected pressure so as to provide communication between the annular space and the third port for dumping hydraulic fluid through the first and second ports to the relief tank.

In the illustrated embodiment, the biasing means comprises spring means disposed within the relief space.

Guide means may be disposed in the relief space for guiding the piston in its movement as effected by the different cylinder pressure conditions.

BRIEF DESCRIPTION OF THE DRAWING

Other features and advantages of the invention will be apparent from the following description taken in connection with the accompanying drawing wherein:

FIG. 1 is a side elevation of an apparatus embodying the invention;

FIG. 2 is a top plan view thereof;

FIG. 3 is a fragmentary vertical section of the pressure relief means with the valve in the closed condition;

FIG. 4 is a fragmentary vertical section thereof with the valve in a crossover position as caused by a high pressure condition in the first port;

FIG. 5 is a fragmentary vertical section thereof with the valve in the crossover position as a result of high pressure in the second valve port; and FIG. 6 is a fragmentary vertical section thereof with the valve in the dump-to-tank position as a result of high pressure existing in both the first and second ports.

DESCRIPTION OF THE PREFERRED EMBODIMENT

In the exemplary embodiment of the invention as disclosed in the drawing, an apparatus generally designated 10 is shown to comprise a wheeled vehicle adapted to move a working element, such as a snowplow 11, over a surface 12. The snowplow defines a blade which is mounted to the vehicle by a lower support 13 having a pivotal connection 14 to a lower portion 15 of the blade. The upper portion 16 of the blade is connected by means of pivots 17 and 18 to a pair of piston rods 19 and 20 extending from pistons 21 and 22, respectively, of hydraulic cylinders 23 and 24, respectively.

As shown in FIG. 2, the piston rods 19 and 20 are variably extensible relative to the cylinders 23 and 24 so as to turn blade 11 about a vertical axis 25 (FIG. 1). In operation of the snowplow, the blade may also pivot about the horizontal axis 26 of pivot 14.

The hydraulic pressure system generally designated 27 for operating the cylinder devices 23 and 24 is schematically illustrated in FIGS. 1 and 2 as including a relief tank 28. Hydraulic fluid is delivered under pressure to a supply line 29 by means of a high pressure pump 30 connected to the tank 28. A manually operable valve 31 is provided for delivering the high pressure hydraulic fluid from supply line 29 to either of delivery lines 32 connected to cylinder 23 or delivery line 33 connected to cylinder 24 as desired.

As seen in FIG. 2, when high pressure fluid is delivered to cylinder 23 from pump 30, piston rod 19 is extended to the right so as to pivot the blade about the vertical axis 25 to the desired angular disposition. Concurrently, piston rod 20 may be retracted by exhausting the cylinder 24 to the return tank 28.

In the illustrated embodiment, the control valve 31 comprises a conventional four-way valve. As shown, cylinder 23 may be mounted to the frame 34 of the apparatus by a pivot 35 and cylinder 24 may be mounted to the frame by a pivot 36 to permit the desired control of the blade disposition discussed above.

As indicated briefly above, the present invention comprehends the provision of a unitary overload relief valve generally designated 37 for controlling overload conditions on the blade as may occur during normal operation thereof. As shown in FIG. 2, relief valve 37 is connected to delivery line 32 by a crossline 38 and is connected to delivery line 33 by a crossline 39. The relief valve is connected to the relief tank 28 by a relief line 40.

The construction of relief valve 37 is illustrated in FIGS. 3-6. As shown therein, the relief valve includes a body 41 defining a piston chamber 42 in which is movably received a piston 43. The piston is slidably received in a cylindrical portion 44 of the body defining a midportion of the piston chamber when the valve is in the closed condition of FIG. 3.

As further shown, the piston carries a valve portion 45 extending from the piston to a valve seat 46 defined by a first port 47 connected to crossline 38.

The valve chamber further defines an annular space 48 surrounding the valve portion 45 and communicating through a second valve port 49 with the crossline 39. Annular space 48 communicates with annular space 44, which is confronted by an annular surface 50 of the piston and thereby exposed to fluid pressure conditions within the annular spaces 48 and 44.

The piston chamber further defines a rearward relief space 51 into which piston 43 may move as the result of an opening of the valve 45,46. A piston rod 52 is connected to the piston to extend through space 51 and into a guide bore 53 so as to effectively guide the piston coaxially in its movement toward and from valve seat 46. A compression spring 54 is provided about the piston rod 52 in relief space 51 and is effectively compressed between body 41 and the rearward surface 55 of the piston so as to bias the piston and valve portion 45 to the left, or seated condition of the valve, as shown in FIG. 3.

The arrangement of the valve under different high pressure conditions of apparatus 10 is illustrated in FIGS. 4-6. Thus, referring more specifically to FIGS. 2 and 4, when the hydraulic fluid in cylinder 23 increases in pressure as by a substantial force acting against the righthand portion of blade 11 connected to piston 21 by piston rod 19, this high pressure is transmitted through crossline 38 to port 47 and, thus, acts against the inner end 52 of the valve portion 45 of piston 43. spring 54 is preselected so as to prevent opening of port 47 until such time as the pressure reaches a preselected first high value, whereupon the force generated by the pressure acting against valve and 52 overcomes the biasing force of spring 54 and shifts the piston and valve to the right, as seen in FIG. 4, to provide communication from port 47 through annular space 48 to second port 49 which is connected by crossline 39 to the cylinder 24. Thus, the cylinders are cross-connected under such high pressure conditions so as to relieve the high pressure from cylinder 23 to cylinder 24, thereby avoiding damage to the hydraulic system 27.

As the piston 43 moves to the right in FIG. 4, the piston rod 52 displaces hydraulic fluid from the bore 53 through a relief passage 57 to a third port 56 of body 41 communicating with relief space 51. Relief port 56 communicates with tank 28 through the return line 40 so as to return the hydraulic fluid to the tank for recirculation by pump 30, as discussed above.

In the event that a high pressure condition exists in cylinder 24 as by a high force being applied to the left portion of blade 11 so as to urge piston 22 rearwardly, as seen in FIG. 2, the high pressure condition is transmitted through crossline 39 to port 49 of the valve body 41 communicating with space 48 inwardly of the valve seat 46. This high pressure condition acts against the annular surface 50 of piston 43 exposed to the annular space 48,44. In the illustrated embodiment, the area of the annular surface 44 is substantially equal to the cross-sectional area of port 47, or valve seat 46. Thus, a hydraulic pressure in space 48,44 delivered thereto by crossline 39 causes a movement of the valve 45 and piston 43 to the right, as shown in FIG. 5, similarly to the movement effected to the right, as shown in FIG. 4, by a high pressure condition existing in port 47. Resultingly, the high pressure fluid is transferred to the port 47 and, thus, through crossline 38 to the cylinder 23 to relieve the high pressure condition acting on the cylinder 24 and thereby avoid damage to the hydraulic system 27.

Thus, when a preselected pressure is induced in either of ports 47 or 49, the valve 45 and piston 43 are moved to the right, as seen in FIGS. 4 and 5, to relieve that high pressure condition to the opposite cylinder.

At certain times, a high pressure condition may exist in both cylinders 23 and 24 as when a high load is applied uniformly across the blade which would tend to pivot the blade about the horizontal axis 26 and, thus, move each of piston rods 19 and 20 rearwardly, or to the left, as seen in FIG. 2, thereby applying a high pressure to both ports 47 and 49 through the respective crosslines 38 and 39. This second preselected high pressure condition being substantially greater than the first preselected high pressure conditions effecting operation of the valve means as shown in FIGS. 4 and 5, causes a further, or greater, movement of the valve 45 and piston 43 to the right, as seen in FIG. 6, so as to move piston 43 into the relief space 51, thereby providing communication between the annular space 48,44 and the relief port 56 so as to dump the hydraulic fluid to tank 28 through the return line 40 connected to relief port 56. The relief of the high pressure condition again prevents damage to the hydraulic system 27 under this second, higher pressure condition.

Upon relief of any of the above discussed pressure conditions, spring 54 returns the valve 45 to the closed position of FIG. 3, thereby again permitting normal use of the apparatus 10 as in a snowplowing operation.

It may be seen that the relief valve 37 is extremely simple and economical of construction utilizing only a single movable valve member and biasing means while yet providing the improved cross relief and dumping relief functioning discussed above.

The foregoing disclosure of specific embodiments is illustrative of the broad inventive concepts comprehended by the invention.

I claim:

1. In an apparatus having a working element defining first and second spaced support portions, a first cylinder having a piston provided with a rod connected to said first support portion, a second cylinder having a piston provided with a rod connected to said second support portion, and adjustably controlled hydraulic supply means connected to said cylinders and including a return tank for providing hydraulic fluid to said cylinders for adjustably positioning said piston rods to position and retain said working element as desired, improved pressure relief means comprising:

a body defining a piston chamber, a first port opening to said chamber and connected to said first cylinder, a second port opening to said piston chamber and connected to said second cylinder, and a third port opening to said piston chamber and connected to said return tank;

a piston in said chamber having a valve portion removably seating on said body at said first port for selectively closing said first port and defining in said chamber an annular space communicating with said second port at all times, said piston defining at an inner end of said space a pressure surface; and spring means biasing said piston to cause said valve portion to close said first port, said spring means piston and ports being arranged in a closed condition of the pressure relief means to have fluid pressure from either of said first cylinder acting on said valve portion closing said first port or fluid pressure from said second cylinder acting on said pressure surface to cause said piston to move against the action of the biasing means sufficiently to provide communication between said first and second ports through said annular space thereby as an incident of a first preselected high fluid pressure being delivered to either of said first and second ports, and to cause said piston to move further against the action of the biasing means and provide communication between said first, second and third ports through said piston chamber to dump fluid therethrough to said return tank as an incident of a second preselected, cumulative fluid pressure higher than said first preselected pressure resulting from high fluid pressure being delivered to said first and second ports concurrently, said piston having a piston rod movably engaging said body for guiding said piston in the movement thereof by said fluid pressures, said spring means comprising a coil spring concentric about said piston rod between said piston and said body.

2. The apparatus of claim 1 wherein said cross-sectional area of said first port is substantially equal to the cross-sectional area of said pressure surface.

3. The apparatus of claim 1 wherein said first and second ports are of equal cross-sectional area.

4. The apparatus of claim 1 wherein said first and second ports open perpendicularly to each other substantially contiguously.

5. The apparatus of claim 1 wherein said working element comprises a plow.

6. The apparatus of claim 1 wherein said support portions comprise horizontally spaced portions.

* * * * *